(12) United States Patent
Naffziger

(10) Patent No.: US 6,448,837 B1
(45) Date of Patent: Sep. 10, 2002

(54) REDUCED CURRENT VARIABILITY I/O BUS TERMINATION

(75) Inventor: Samuel D. Naffziger, Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/754,667

(22) Filed: Jan. 4, 2001

(51) Int. Cl.[7] .................................................. H03K 5/08
(52) U.S. Cl. .......................... 327/310; 327/379; 326/30
(58) Field of Search ................................. 327/108, 170, 327/309, 310, 379, 380, 112, 331; 326/21, 30, 85, 86, 87, 17, 31, 34, 32, 82

(56) References Cited

U.S. PATENT DOCUMENTS

| | | | | |
|---|---|---|---|---|
| 5,254,883 A | * | 10/1993 | Horowitz et al. ............ 326/30 |
| 5,338,979 A | * | 8/1994 | Mamano et al. ............. 326/30 |
| 5,359,235 A | * | 10/1994 | Coyle et al. ................ 327/108 |
| 5,420,525 A | * | 5/1995 | Maloberti et al. ........... 326/27 |
| 5,528,167 A | * | 6/1996 | Samela et al. ............... 326/30 |
| 5,576,642 A | * | 11/1996 | Nguyen et al. .............. 326/86 |
| 5,721,875 A | * | 2/1998 | Fletcher et al. .............. 326/80 |
| 5,819,099 A | * | 10/1998 | Ovens ......................... 326/68 |
| 5,959,481 A | * | 9/1999 | Donnelly et al. ........... 327/170 |

* cited by examiner

Primary Examiner—Matthew Smith
Assistant Examiner—Paul Dinh
(74) Attorney, Agent, or Firm—Alexander J. Neudeck

(57) ABSTRACT

A shunt and shunt control circuit are connected to the wires of an on-chip terminated I/O bus. Each instance monitors the wire that it is connected to. If the wire has been pulled low by any device on the bus, the circuit does nothing. If, however, the wire was not pulled low, then current is shunted from the termination voltage supply to ground. The turn on and turn off rates for this shunt are matched to the ramps of current through the termination impedance of the bus. This makes the variability in current drawn from the termination voltage supply less data dependent.

10 Claims, 1 Drawing Sheet

US 6,448,837 B1

REDUCED CURRENT VARIABILITY I/O BUS TERMINATION

FIELD OF THE INVENTION

The present invention relates generally to integrated circuits, and more particularly, to techniques and circuits for improving noise margins on on-chip terminated I/O busses and reducing power supply droop and ground bounce oscillations.

BACKGROUND OF THE INVENTION

One of the causes of reduced, or variable, termination voltages is a change in the amount of current drawn from the termination voltage supply lines. The changes in the amount of current drawn excites oscillations in the inherent inductances in the termination voltage lines. These inherent inductances include inductaces from the package leads and bond wires. The frequency of these oscillations depends upon a number of factors that vary from package-to-package and chip-to-chip. However, on a high-performance I/O (input/output) bus, the frequency of operation may be much greater than the frequency of the oscillations on termination voltage lines. Accordingly, it is important that the I/O circuits on these busses be designed to operate over a range of termination voltages.

If circuits are not designed to operate over a range of termination voltages, the lines on the bus may not meet their switch times or noise margin requirements and the operating frequency of the bus may have to be lowered. Thus, to meet frequency goals, the termination voltage may be increased to obtain minimum acceptable operating conditions. This increased termination voltage increases the integrated circuit's power dissipation. Increased power dissipation can increase the cost of several components of a system including the integrated circuit packaging, heat sink, and the system power supply. Furthermore, increasing the termination voltage tends to decrease the operating lifetime of the part thereby increasing the cost of system maintenance and amortized cost.

Accordingly, there is a need in the art for an apparatus and method that reduces the changes in the amount of current drawn on a bus termination voltage supply.

SUMMARY OF THE INVENTION

An embodiment of the invention reduces the changes, or variability, in the amount of current drawn from the termination voltage supply of an I/O bus. This, in turn, reduces the range of voltages over which a termination voltage may vary. It is well adapted for fabrication on integrated circuits and can be particularly effective when used on wide, parallel, high-speed I/O busses.

Instances of an embodiment of the invention are connected to the wires of an on-chip terminated I/O bus. Each instance monitors the wire that it is connected to. If the wire has been pulled low by any device on the bus, the circuit does nothing. If, however, the wire was not pulled low, then the invention shunts current from the termination voltage supply to ground. The turn on and turn off rates for this current shunt are matched to the ramps of current through the termination resistor of the bus. This makes the variability in current drawn from the termination voltage supply less data dependent. Making the current drawn from the termination voltage supply less data dependant reduces the magnitude of the inductive oscillations on the termination voltage which reduces the range of termination voltages over which the bus must be designed to operate.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
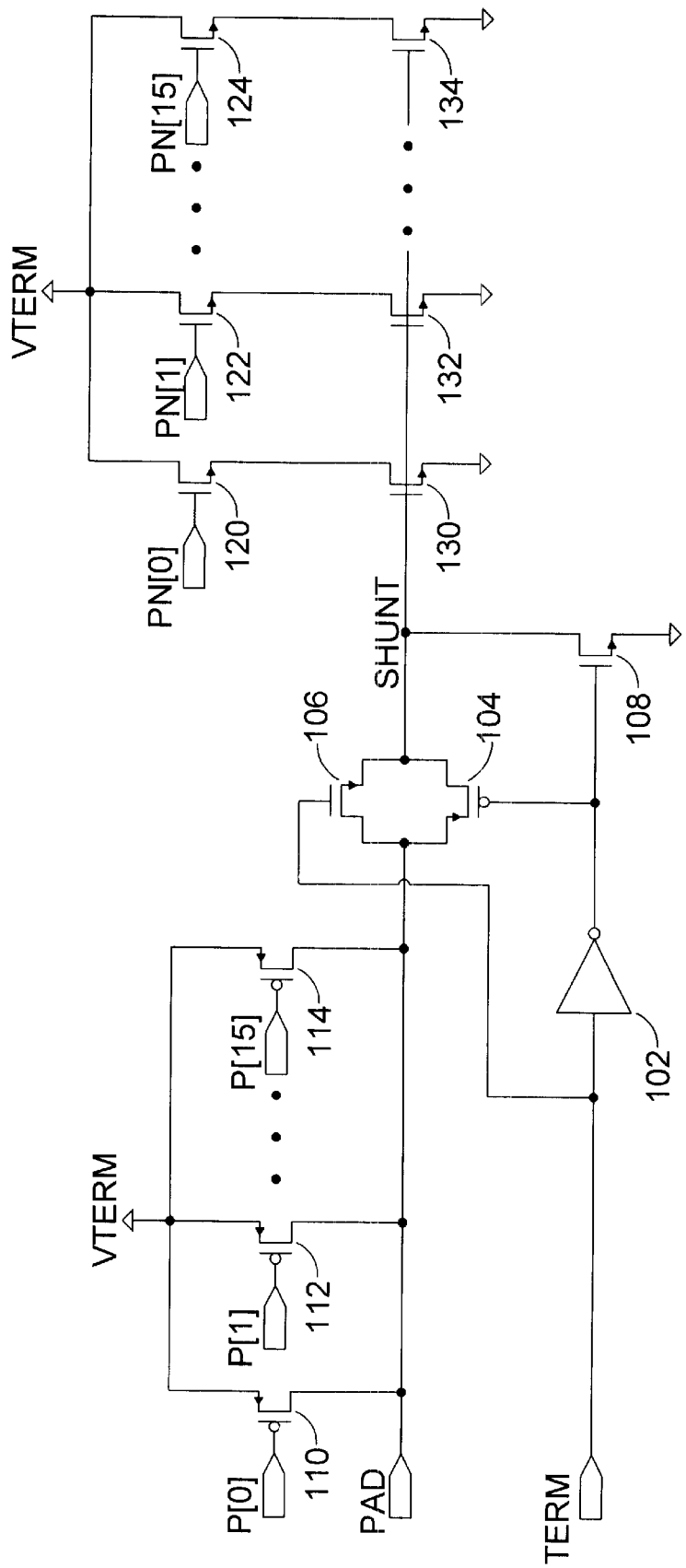
FIG. 1 is a schematic illustration of a termination voltage current shunt.

FIG. 1 is a schematic illustration of a termination voltage current shunt. In FIG. 1 p-channel metal-oxide-semiconductor field effect transistors (PFETs) 110, 112, 114 represent sixteen PFETs controlled by signals P[0:15]. The PFETs represented by 110, 112, and 114 provide a termination resistance between the termination voltage supply, VTERM, and an I/O bus line, PAD. Accordingly, the sources of each of the PFETs represented by 110, 112, and 114 are connected to VTERM and the drains of each of the PFETs represented by 110, 112, 114 are connected to PAD.

The signals P[0:15] are set by other circuitry such that the resistance collectively provided by the PFETs between VTERM and PAD is roughly constant over a range of variations in the impedance of each individual PFET caused by variations due to manufacturing processes, variations in operating voltage, and temperature effects. The variations in the impedance of these PFETs are often called PVT variations. PVT stands for process, voltage, temperature.

Similarly, n-channel metal-oxide-semiconductor field effect transistors (NFETs) 120, 122, 124 represent sixteen NFETs controlled by signals PN[0:15]. The signals PN[0:15] are set by other circuitry such that the resistance collectively provided by all of the NFETs represented by 120, 122, 124, if they were placed in parallel with each other, would be constant over a range of PVT effects. The drain of each of the NFETs represented by 120, 122 and 124 are connected to VTERM. The sources of each of the NFETs represented by 120, 122 and 124 are each connected to the drain of sixteen other NFETs represented by NFETs 130, 132, and 134, respectively. The sources of each of the NFETs represented by 130, 132, and 134 are connected to ground. The gates of each of the NFETs represented by 130, 132, and 134 are connected to the signal SHUNT.

In the preferred embodiment, signals P[0:15] and PN[0:15] are set to the same values by connecting P[0] to PN[0], P[1] to PN[1], etc. This reduces the number of signals that need to be distributed. Also, the amount of circuitry required to generate these signals is reduced.

Input signal TERM indicates whether the termination voltage current shunt is active. TERM is connected to the input of inverter 102 and the gate of NFET 106. The output of inverter 102 is connected to the gate of PFET 104 and the gate of NFET 108. The source of NFET 108 is connected to ground and the drain of NFET 108 is connected to SHUNT. The drain of NFET 106 and the source of PFET 104 are both connected to PAD. The source of NFET 106 and the drain of PFET 104 are both connected to SHUNT.

When TERM is at a logical "0", current is not shunted from VTERM at any time. When TERM is at a logical "0", NFET 106 is off and the output of inverter 102 is at a logical "1". This turns PFET 104 off and NFET 108 on pulling SHUNT to a logical "0". This ensures that the NFETs represented by 130, 132, and 134 are all off preventing any current from being shunted from VTERM through the NFETs represented by 120, 122 and 124.

When TERM is at a logical "1", the termination voltage current shunt is active and current may be shunted from VTERM through the NFETs represented by 120, 122 and 124 and through the NFETs represented by 130, 132, and 134 to ground. When TERM is at a logical "1", then NFET 108 is off and NFET 106 and PFET 104 are both on. This allows the voltage on PAD to control the voltage on SHUNT which, in turn, determines the impedance of the NFETs represented by 130, 132, and 134.

Accordingly, when the voltage level on PAD is near ground, the gates of NFETs represented by 130, 132, and 134 are also near ground. Therefore, the NFETs represented by 130, 132, and 134 are all in a high-impedance state that prevents a significant amount of current from flowing from VTERM through the NFETs represented by 120, 122 and 124 and through the NFETs represented by 130, 132, and 134 to ground.

When the voltage level on PAD is above the threshold voltage of the NFETs represented by 130, 132, and 134, these NFETs begin to conduct. This allows current to be shunted from VTERM through the NFETs represented by 120, 122 and 124 and through the NFETs represented by 130, 132, and 134 to ground.

In operation, when VTERM is high, PAD is connected to a line of an I/O bus that is terminated at least by an impedance set by the PFETs represented by 110, 112, and 114 to VTERM. Other devices, either on or off the same integrated circuit, turn on and pull PAD and the rest of that line to lower voltage levels than VTERM. This lower voltage level signals a first logic state of the bus. This first logic state may indicate either a logical "1" or a logical "0" in a binary system, or at least one of a number of other states in a system with a greater number than two logic states. When PAD and the rest of the line is pulled to lower, a first current flows from VTERM onto PAD through the PFETs represented by 110, 112, and 114. When PAD and the rest of the line is not pulled lower, there is no current flowing from VTERM through the PFETs represented by 110, 112, and 114. Accordingly, without the termination voltage current shunt the amount of current flowing from VTERM may vary considerably-from zero to the first current amount.

When the termination voltage current shunt is connected and active and PAD is not pulled lower (and hence there is not current flowing through the PFETs represented by 110, 112, and 114) the NFETs represented by 130, 132, and 134 are turned on causing a second current to flow from VTERM through the NFETs represented by 120, 122 and 124 and through the NFETs represented by 130, 132, and 134 to ground. When this second current is set to approximate the first current, above, by appropriate sizing of the transistors represented by 120, 122, 124 130, 132, and 134 and the state of PN[0:15], the variability in the amount of current drawn from VTERM that depends upon the voltage level of PAD is reduced.

Although a specific embodiment of the invention has been described and illustrated, the invention is not to be limited to the specific forms or arrangements of parts so described and illustrated. The invention is limited only by the claims.

What is claimed is:

1. A CMOS signal line termination, comprising:

an external signal line;

a digital active PVT controlled termination impedance comprising a first plurality of FETs connected to conduct between said external signal line and a termination voltage supply; and, a digital active PVT controlled shunt impedance comprising a second plurality of FETs connected to conduct between said termination voltage supply and a first terminal of a third at least one FET, said third at least one FET connected to conduct between said first terminal and a voltage supply and said third at least one FET being controlled by a voltage on said external signal line to conduct when current is not flowing through said first plurality of FETs.

2. The CMOS signal line termination of claim 1 wherein said third at least one FET conducts when said voltage on said external line exceeds a first voltage.

3. The CMOS signal line termination of claim 1 wherein said third at least one FET conducts when said voltage on said external line drops below a first voltage.

4. The CMOS signal line termination of claim 1 wherein members of said first plurality of FETs are individually controlled to either conduct or not conduct to compensate for PVT variations.

5. The CMOS signal line termination of claim 1 wherein members of said second plurality of FETs are individually controlled to either conduct or not conduct to compensate for PVT variations.

6. The CMOS signal line termination of claim 1 wherein members of said first plurality of FETs and said second plurality of FETs are individually controlled to either conduct or not conduct to compensate for PVT variations.

7. The CMOS signal line termination of claim 6 wherein members of said first plurality of FETs and members of said second plurality of FETs are controlled substantially identically.

8. A signal termination, comprising:

an external signal line terminated through a digital active PVT controlled impedance to a termination voltage supply, wherein a first current is drawn from said termination voltage supply through said digital active PVT controlled impedance when said external signal line is in a first state and wherein said digital active PVT controlled impedance comprises a first plurality of switching devices; and, means for drawing an a second current through a second digital active PVT controlled impedance from said termination voltage supply when said first current is not being drawn from said termination voltage supply.

9. The signal termination of claim 8 wherein said means for drawing said second current comprises a second plurality of switching devices controlled by a same set of signals as said first plurality of switching devices.

10. The signal termination of claim 8 wherein said second current approximates said first current.

* * * * *

UNITED STATES PATENT AND TRADEMARK OFFICE
CERTIFICATE OF CORRECTION

PATENT NO. : 6,448,837 B1 Page 1 of 1
DATED : September 10, 2002
INVENTOR(S) : Samuel D. Naffziger It is certified that error appears in the above-identified patent and that said Letters Patent is hereby corrected as shown below:

<u>Column 4,</u>
Line 50, after "drawing" delete "an"

Signed and Sealed this

Fourth Day of January, 2005

JON W. DUDAS
*Director of the United States Patent and Trademark Office*